United States Patent [19]

Baillie

[11] Patent Number: 4,872,336

[45] Date of Patent: Oct. 10, 1989

[54] APPARATUS FOR PRESSURE TESTING PIPELINES

[75] Inventor: Lloyd A. Baillie, Plano, Tex.

[73] Assignee: Atlantic Richfield Co., Los Angeles, Calif.

[21] Appl. No.: 253,781

[22] Filed: Oct. 5, 1988

[51] Int. Cl.[4] ............................................. G01M 3/04
[52] U.S. Cl. ................................... 73/40.5 R; 73/49.5
[58] Field of Search .......... 73/40.5 R, 40.5 A, 40.5 P, 73/49.5

[56] References Cited

U.S. PATENT DOCUMENTS

| | | | |
|---|---|---|---|
| 3,483,895 | 12/1969 | Barto | 138/93 |
| 3,690,348 | 9/1972 | Patterson | 138/97 |
| 4,646,787 | 3/1987 | Rush et al. | 73/40.5 R |

Primary Examiner—John Chapman
Assistant Examiner—Michele Simons
Attorney, Agent, or Firm—Michael E. Martin

[57] ABSTRACT

Apparatus for pressure testing fluid transmission pipelines comprising spaced apart annular inflatable seal members supported by support members which are interconnected by an elongated flexible tube to define an annular space which may be pressurized to pressure test a section of pipe between the seal members. The tubular member defines a flow passage for pipeline fluid during operation of the apparatus. A fluid motor is disposed in the passage and drivably connected to a hydraulic pump which receives fluid from the pipeline to pressurize the seal members and the annular space. The pump may be remotely controlled by radio control receiver-transmitter apparatus to operate the pressure testing apparatus and to monitor pressures in the seal members and the test space. The pump and control members may be disposed in a housing which is mounted adjacent one end of the apparatus. The apparatus is propelled through a pipeline by pressure fluid in the line.

12 Claims, 1 Drawing Sheet

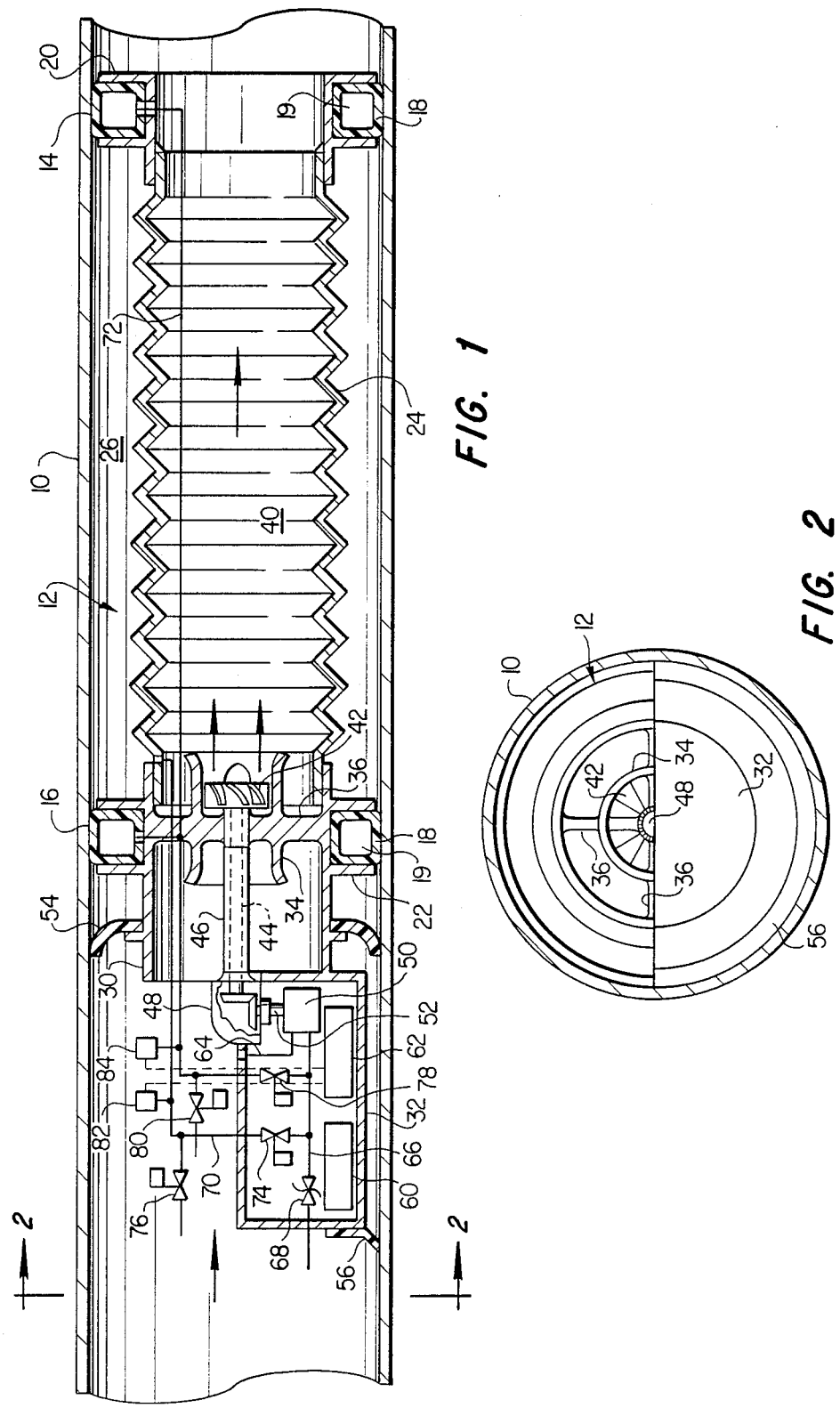

APPARATUS FOR PRESSURE TESTING PIPELINES

BACKGROUND OF THE INVENTION

1. Field of the Invention

The present invention pertains to an apparatus for traversal through a fluid transmission pipeline and for providing an annular sealed test space for pressure testing selected sections of the pipeline. The apparatus is remote controlled and utilizes flow of pipeline fluid through the apparatus for providing power to pressurize the test space and spaced apart annular seals which define the sealed test space.

2. Background

Fluid transmission pipelines require periodic pressure testing to determine the integrity of the pipe or to locate suspected leaks. Examples of prior art pipeline testing apparatus comprise the devices described in U.S. Pat. Nos. 3,483,895 to Barto, 3,690,348 to Patterson, 3,834,422 to Larson and 4,602,659 to Parkyn. The devices described in all but the Larson patent require the use of two of the devices described for isolating a section of pipeline for pressure testing or the device must be used in conjunction with a pipeline valve at a particular location already existing in the pipeline to isolate the test section. In this latter instance a significantly long section of pipeline may be required to be pressurized for the test procedure and the complexity of using two of the line blocking "valves" as described in these references is difficult to manage in many instances. Accordingly, there has been a need for a device which will isolate a selected section of pipeline for pressurization, which device may in itself be moved along the line to various predetermined positions for pressure testing the selected small sections of the pipeline.

Another problem associated with so-called travelling valves for pipelines is the provision of onboard power for operating the seals to inflate and deflate and to provide fluid for accomplishing the pressure testing and seal actuation. It is to this end among other objectives that the present invention has been developed.

SUMMARY OF THE INVENTION

The present invention provides an improved apparatus for providing fluid pressure testing of pipelines and the like. In accordance with one aspect of the present invention there is provided an apparatus which is adapted to provide a substantially fluid tight annular test space in a section of pipeline for pressurization to inspect the pipeline structural integrity or to locate possible leaks in the pipeline. The present invention is characterized by the provision of a single device which may be propelled through the pipeline by pipeline fluid and may be positioned at a predetermined location in the pipeline for isolation of a relatively short section of pipeline for pressurization to carry out the tests.

In accordance with another aspect of the present invention, there is provided a pipeline pressure test apparatus which includes spaced apart inflatable seal members which may be pressurized by fluid, which may be from the pipeline itself, to isolate a section of pipeline for pressure testing. The spaced apart seals are interconnected by a flexible conduit which, together with the seals, defines an annular space for pressurization to test the section of pipeline between the seals.

In accordance with still a further aspect of the present invention, there is provided a pipeline pressure test apparatus which allows through flow of pipeline fluid during the pressure test so as to avoid complete shutdown of pipeline fluid flow during the testing operation or during the presence of the apparatus in the pipeline.

In accordance with yet another aspect of the present invention, there is provided a pipeline pressure testing device which utilizes the flow of pipeline fluid to provide power for operating a pump to pressurize spaced apart seal members which define the test space and to provide pressure fluid for pressurizing the test space in the pipeline. The apparatus may be propelled through the pipeline in the same manner as a so-called "pig" and is adapted to traverse bends and curves in the pipeline easily, although the apparatus may be of substantially greater length than conventional pipeline pigs and similar apparatus.

Those skilled in the art will recognize the abovedescribed features and advantages of the present invention together with other superior aspects thereof upon reading the detailed description which follows in conjunction with the drawing.

BRIEF DESCRIPTION OF THE DRAWING

FIG. 1 is a longitudinal central section view of a section of pipeline which includes therein the apparatus of the present invention illustrated in somewhat schematic form; and FIG. 2 is a view taken substantially along the line 2—2 of FIG. 1.

DESCRIPTION OF A PREFERRED EMBODIMENT

In the description which follows like parts are marked throughout the specification and drawing with the same reference numerals, respectively. The drawing figures are not necessarily to scale and certain features are shown in somewhat schematic form in the interest of clarity and conciseness.

Referring to FIG. 1, there is illustrated a section of fluid transmission pipeline 10 in which is disposed an apparatus in accordance with the present invention and generally designated by the numeral 12. The apparatus 12 comprises a pair of spaced apart resilient seals 14 and 16 which are characterized by annular collar-like members 18 formed of a flexible material such as Neoprene or synthetic rubber. The seal members 18 are each disposed in generally annular channel support members 20 and 22 which are interconnected by an elongated flexible tubular member 24. The member 24 may, for example, comprise a length of accordion pleated stainless steel tubing commonly used for expansion joints in process piping. The member 24 is preferably relatively rigid with respect to expansion or compression forces, but is flexible in bending so that the apparatus may accommodate virtually any bend radius of curvature likely to be encountered in a pipeline such as the pipeline 10. Alternatively, the tubular member 24 may comprise a reinforced, flexible hose such as a hose made of a polymer material encasing a metal or fabric mesh. In all events, the tubular member 24 is suitably connected to the seal support members 20 and 22 to provide an annular space 26 between the seals 14 and 16 into which pressure fluid may be introduced for pressure testing a section of pipeline between the seals 14 and 16. The length of the space 26 may be preselected by selection of the length of the tubular member 24 so that a sufficient length of pipe 10 may be pressure tested while the apparatus 12 is secured in a fixed position in the pipe and the apparatus may then be progressively moved along the pipe for pressure testing selected pipe sections between the seals 14 and 16 as will be described in further detail herein.

Referring further to the drawing figures, the apparatus 12 also includes a generally tubular housing extension 30 which may be integrally formed with the support member 22 and also provides support means for a housing 32 which is of generally semicylindrical shape and houses certain devices to be described further herein. The tubular housing 30 is provided with a generally centrally located flow nozzle or shroud 34 of substantially tubular configuration which is supported by radially extending and circumferentially spaced struts 36, see FIG. 2 also. The shroud 34 should be relatively thinwalled so as to minimize any reduction in the flow area of a flow channel 40 formed by the housing 30. The housing 30 together with the tubular member 24 further defines a flow channel 40 which permits flow of pipeline fluid through the apparatus 12 from one end to the other. The flow channel 40 is, of course, of somewhat reduced cross sectional area with respect to the normal cross sectional flow area of the pipe 10 without the apparatus 12 disposed therein, but the flow channel 40 is preferably of cross sectional flow area at least fifty percent of the cross sectional flow area of the pipe 10 and permits substantial flow of pipeline fluid when the apparatus 12 is disposed in the pipe.

The flow of pipeline fluid within the channel 40 also enters the nozzle or shroud 34 and rotatably drives a turbine wheel 42 suitably mounted on bearings, not shown, and drivably connected to a drive shaft 44 disposed in a drive shaft housing 46. The shaft 44 is connected to a bevel gear drive disposed in a housing portion 48 for driving a hydraulic pump 50 having an input drive shaft 52. The pump 50 may be of any suitable type such as a gear, rotary vane or axial piston type and of sufficient capacity to provide for pressurization of the seal members 18 and the annular space 26 as will be described.

As illustrated by way of example, the housing member 30 may be partially supported by a resilient cuplike support member 54 which is engaged with the wall of the pipe 10. An additional resilient support member 56 may also be connected to the housing part 32 for suitable support of the apparatus in a section of pipe for traversal therethrough under the urging of pressure fluid and for placement in a desired location for pressure testing the pipe section between the seals 14 and 16.

The seal members 18 may be, in a sense, inflated by pressurization of their respective internal chambers 19 with pressure fluid to cause the seal members to expand radially outwardly into sealing engagement with the interior wall surface of the pipe 10. By pressurizing the seal members 18 the annular space 26 may be isolated for the introduction of pressure fluid therein for pressure testing the section of pipe between the seals 14 and 16. In a depressurized condition the seals members 14 and 16 are sufficiently resilient so as to relax or retract radially to permit traversal of the apparatus 12 through the pipe 10 under the urging of pressure fluid acting either on the support cup 54, if used, or on the projected area of the housing members 20 or 22. By way of example, the channel portions of the support members 20 and 22 should have a diameter about 0.50 to 0.75 inches less than the diameter of the pipe. For example, the channels could provide an annular space having a dimension of about 1.75 inches by 3.0 inches and a 3.0 inch diameter annular oval tube made of a suitable polymer compatible with pipeline liquid could be used to form the seal members 18. The dimensions of the space between the flanges of the members 20 and 22 would provide for somewhat of a flattening effect on the oval tube members 18. The wall thickness of the seal members 18 might be about 0.37 inches, depending on the strength of the material used to fabricate these members.

It is contemplated that the apparatus 12 could be remotely controlled to operate the seals 14 and 16 to isolate the chamber 26, pressurize the chamber 26 using pipeline fluid, for example, and transmit information concerning the pressure in the chamber 26 as well as the pressure in the seal chambers 19 back to a control unit located remote from the apparatus 12. In this regard, the housing 32 serves to contain a radio control receiver 60 and a transmitter 62 for receiving and transmitting control information and pressure data, for example.

As shown in schematic form in FIG. 1, the pump 50 includes a fluid intake conduit 64 which extends through the housing 32 to receive fluid directly from the pipeline interior. A pump discharge conduit 66 is connected to a pressure relief valve 68 and to separate conduits 70 and 72 which are each, preferably, fitted with electrically controlled valves 74 and 76 and 78 and 80, respectively. The pressure relief valve 68 permits the pump 50 to run constantly while delivering pressure fluid at a certain maximum pressure to the conduit 66. Pressure transducers 82 and 84 are also in communication with the respective conduits 70 and 72. The conduit 72 leads to both of the chambers 19 for the seal members 18 and operation of the pump 50 and the valves 78 and 80 may be controlled to pressurize these chambers to expand the seal members into sealing and gripping engagement with the wall of the pipe 10. The pressure in the seal members 18 may be transmitted by the transducer 84 to the transmitter 62 for telemetry to a remote control station, not shown. Operation of the valves 76, 78, 80 and 82 is preferably remotely controlled through the radio receiver and control unit 60 also utilizing signals telemetered from the aforementioned remote control station. When the seals 14 and 16 are pressurized to isolate the chamber 26, this chamber may be pressurized by fluid from the pump 50 by way of the conduit 70 so that the pressure in the chamber 26 may be raised to that which is suitable for pressure testing the section of pipe 10 between the seals 14 and 16.

The continuous flow of fluid through the chamber 40 driving the turbine 42 will, in turn, drive the pump 50 to provide fluid for maintaining pressure in the chambers 19 and 26. Of course, a suitable source of electric power such as batteries, not shown, will also be contained within the housing 32 for operation of the receiver 60, the transmitter 62 and the associated electrically controlled elements such as the valves 74, 76, 78 and 80. The valves 68, 74, 76, 78 and 80 are preferably disposed in the housing 32 and are shown in schematic form in the drawing.

The operation of the apparatus 12 is believed to be understandable from the foregoing description of its structural and functional features. However, briefly, the apparatus 12 may be inserted in a fluid filled pipeline such as the pipeline 10 and propelled therethrough by the force of fluid being pumped through the line to a predetermined position for carrying out a pressure test of the pipe wall in a selected region. The resilient support cup 54 provides a sufficient projected area upon which the fluid may act and the seal members 18 are in a relaxed condition to prevent gripping engagement of the pipe wall. When the apparatus 12 has been launched into a pipeline, a suitable signal transmitting device in the housing 32 may be utilized to indicate the location of the apparatus as it moves through the pipe.

When the apparatus 12 has been positioned in a desired location by the control of flow of fluid through the pipe, there will be sufficient propelling effort of the fluid acting on the motor means comprising the turbine 42 to continuously drive pump 50 to provide a charge of pressure fluid by way of the conduits 66 and 72 to the chambers 19 of each of the seal members 18 to inflate these members so that they grip the wall of the pipe 10 in sealing engagement and with sufficient force to prevent longitudinal movement of the apparatus 12 through the pipe. The valves 78 and 80 are suitably controlled to permit pressurization of the seal members 18 by fluid from the pump 50 which is by way of the pipe itself. When the seal members 18 have been inflated into sealing engagement with the pipe 10 the valves 74 and 76 are actuated to provide for the flow of pressure fluid into the chamber 26 by way of the conduit 70 to pressurize this chamber and the section of pipe to be tested. Again, the source of pressure fluid is from the turbine driven pump 50 which is drawing fluid from the interior of the pipe for discharge to the conduit 70. Readings may be taken from the transducer 82 by way of the transmitter 62 during the pressure test. By way of example, if pipeline pressure is 200 psig, the pressure acting on the seals 14 and 16 in the chambers 19 could be raised to 400 psig and the pressure in the annular space 26 could easily be increased to 300 psig. In this way, the pressure differential across the wall of the pipe 10 in the test section would be 300 psi while the pressure differential across the seals 14 and 16 and the tubular member 24 would be only 100 psi.

When it is desired to move the apparatus 26, pressure in the space 26 is relieved by relieving the pressure in the seal chambers 19 by opening the valve 80, for example. The pressure may also be relieved in the chamber 26 by opening the valve 76 and closing the valve 74. With the pressure relieved in the seal members 18, the apparatus may then be propelled further along the pipe 10 under the urging of pressure fluid flowing therethrough which may be controlled as desired to move the apparatus to a new location for pressure testing of another section of pipe.

The cross sectional flow area of the chamber 40 in relation to the total cross sectional flow area of the pipe 10 would vary in accordance with the size of the pipe into which the apparatus 12 would be required to be designed to fit. However, it is contemplated that the cross sectional flow area of the chamber or passage 40 would be sufficient to permit at least thirty-five percent to forty percent of the cross sectional flow area of the pipe for a pipe as small as 12.0 inches in diameter. The turbine nozzle 34 might encompass the entire cross sectional area of the chamber 40 or some flow area less than the chamber or passage 40, as illustrated.

Although a preferred embodiment of the present invention has been described in detail herein those skilled in the art will recognize that various substitutions and modifications may be made to the embodiment disclosed without departing from the scope and spirit of the invention as recited in the appended claims.

What I claim is:

1. Apparatus for pressure testing a section of pipe of a fluid transmission pipeline without shutoff of fluid flow through said pipeline during said pressure test, said apparatus comprising:
   spaced apart seal means for engaging a wall of said pipe to form a substantially fluid pressure tight seal therewith;
   generally flexible tubular means interconnecting said seal means and defining with said seal means a generally annular space between said seal means for pressure fluid testing said section of pipe between said seal means;
   pump means for pumping pressure fluid to flow into said seal means and said annular space for pressurizing said seal means to form a fluid tight seal to prevent leakage of fluid from said annular space and to increase the pressure of fluid in said annular space for said pressure testing said section of pipe; and
   conduit means connected to said pump means for receiving pressure fluid from within said section of pipe for pressurizing said seal means and said annular space.

2. The apparatus set forth in claim 1 including:
   motor means drivably connected to said pump means for discharging pressure fluid to said seal means and said annular space, said motor means being operable to be driven by fluid flow through said section of pipe to drive said pump means.

3. The apparatus set forth in claim 2 wherein:
   said motor means comprises a turbine motor disposed in a passage providing for the through flow of pressure flow through said apparatus during operation of said apparatus to pressure test said section of pipe.

4. The apparatus set forth in claim 3 wherein:
   said passage is defined at least in part by said tubular means.

5. The apparatus set forth in claim 3 wherein:
   said passage has a cross sectional flow area at least about 50% of the cross sectional flow area of said section of pipe.

6. The apparatus set forth in claim 1 wherein:
   said seal means comprises spaced apart annular seal members each having a generally annular interior chamber adapted to receive pressure fluid to inflate said seal members to sealingly engage the wall of said pipe.

7. The apparatus set forth in claim 1 wherein:
   said tubular means comprises a flexible metal bellows which is substantially rigid in compression or tension but which may undergo lateral bending to accommodate a change in curvature of said section of pipe.

8. The apparatus set forth in claim 1 wherein:
   said seal means includes substantially annular channel members and flexible annular seal members therein for engagement with the wall of said pipe under the urging of pressure fluid acting on said seal members, respectively.

9. Apparatus for pressure testing the interior of a section of fluid transmission pipeline comprising:
   a pair of spaced apart seal members, each of said seal members being responsive to the action of pressure fluid acting on said seal members to move into sealing engagement with a section of pipe to prevent the flow of fluid from a chamber formed between said seal members with respect to said section of pipe;

an elongated flexible tubular member interconnecting said seal members and defining with said seal members said chamber, said tubular member defining a through flow passage through said apparatus to prevent total blocking of pressure fluid flow through said section of pipe during the presence of said apparatus in said section of pipe;

pump means for receiving pressure fluid from said section of pipe for pressurizing said seal means; and fluid responsive motor means drivably connected to said pump means and responsive to the flow of fluid through said section of pipe to cause said pump means to pressurize said seal means at will to form a substantially fluid tight seal in a section of said pipe between said seal means.

10. The apparatus set forth in claim 9 wherein:

said pump means is connected to conduit means including flow control means for conducting pressure fluid to said chamber.

11. Apparatus for pressure testing a section of pipe of a fluid transmission pipeline without shutoff of fluid flow through said pipeline during said pressure test, said apparatus comprising:

spaced apart seal means for engaging a wall of said pipe to form a substantially fluid pressure tight seal therewith;

generally flexible tubular means interconnecting said seal means and defining with said seal means a generally annular space between said seal means for pressure fluid testing said section of pipe between said seal means, said tubular means comprising a flexible metal bellows which is substantially rigid in compression and tension but which may undergo lateral bending to accommodate a change in curvature of said section of pipe; and pump means for pumping pressure fluid to flow into said seal means and said annular space for pressurizing said seal means to form a fluid tight seal to prevent leakage of fluid from said annular space and to increase the pressure of fluid in said annular space for pressure testing said section of pipe.

12. Apparatus for testing a section of pipe of a fluid transmission pipeline without shutoff of fluid flow through said pipeline during said testing, said apparatus comprising:

spaced apart seal means for engaging a wall of said pipe to form a substantially fluid pressure tight seal therewith;

tubular means interconnecting said seal means and defining with said seal means a generally annular space between said seal means for pressure fluid testing said section of pipe between said seal means;

pump means for pumping pressure fluid to said seal means for pressurizing said seal means to form a fluid tight seal to prevent leakage of fluid from said annular space; and motor means drivably connected to said pump means for discharging pressure fluid to said seal means, said motor means being operable to be driven by fluid flow through said section of pipe to drive said pump means.

* * * * *